Patented Feb. 5, 1946

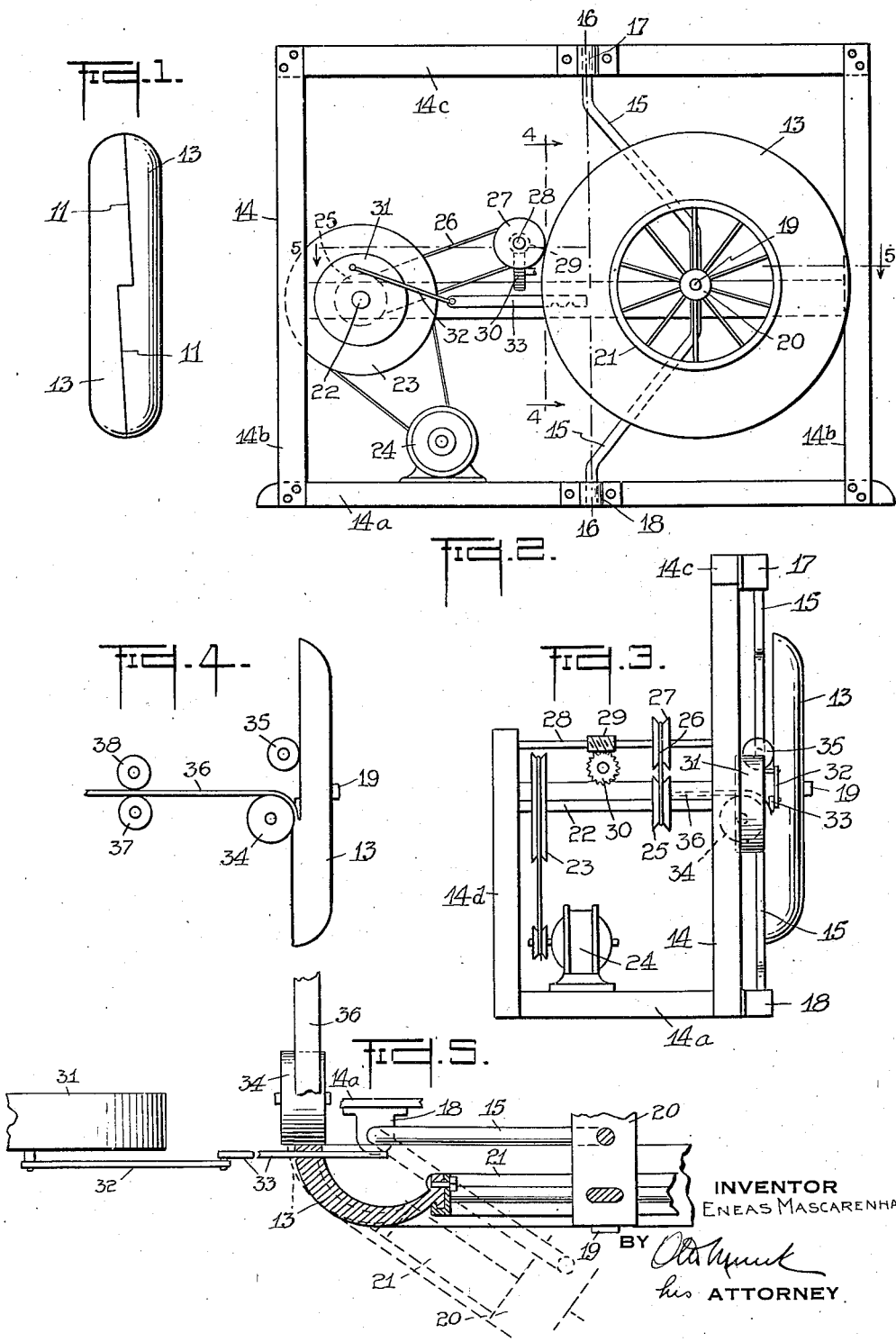

2,394,392

UNITED STATES PATENT OFFICE 2,394,392

TIRE CUTTING MACHINE

Enéas Guimarães Mascarenhas,
Juiz de Fóra, Brazil

Application November 23, 1943, Serial No. 511,411
In Brazil January 25, 1943

4 Claims. (Cl. 164—49)

The present invention relates to a machine for cutting pneumatic tires into strips.

One object of the invention is to provide a machine which cuts a half-tire into a continuous strip along a spiral line.

Another object of the invention is to provide a machine for effecting such cutting operation with great speed and accuracy and which is easy to operate.

Still another object of the invention is to provide a tire cutting machine which cuts tires into long strips of regular, substantially rectangular cross-section with substantially parallel side edges.

These and other objects which will appear more clearly as the specification proceeds are accomplished according to the present invention by the arrangement and combination of parts set forth in the following detailed description, defined in the appended claims and illustratively exemplified in the accompanying drawing, in which Fig. 1 is an edge view of a pneumatic tire showing the helical and the transverse line along which the tire is split before being mounted on the machine according to the invention.

Fig. 2 is a front elevation of the tire cutting machine according to the invention with a half-tire mounted thereon, some parts being broken away for the sake of clarity.

Fig. 3 is a side elevation of the tire cutting machine seen from the left hand side of Fig. 2.

Fig. 4 is a separate view of the half-tire with the guiding and pulling rollers for the cut strip, taken on line 4—4 of Fig. 2, and Fig. 5 is substantially a horizontal section on a larger scale through a portion of Fig. 2 taken on the line 5—5.

Preparatory to the mounting of a tire to be cut on the strip cutting machine according to the invention, the tire is split by hand, as shown in Fig. 1, along a helical line 11 and along a short transverse line connecting the two ends of the helical line 11 to form two half-tires 13 each in the shape of an annulus having a cross-section corresponding substantially to that of a hollow half cylinder.

The tire cutting machine, according to the invention, comprises a frame 14 including a base plate 14a, two front uprights 14b, a top beam 14c resting on said uprights 14b and rear uprights 14d. Two cranked arms 15 pivoted on a common vertical axis 16 in bearings 17 and 18 secured to the front faces of the base plate 14a and of the beam 14c and extending towards each other support on their free ends a horizontal axle 19 at a distance from the axis 16 approximately equal to the outer diameter of an annular half-tire 13 minus the radius of the imaginary circle a sector of which is represented by any cross-section through the annulus 13. A wheel 20 is rotatably mounted on the axle 19 and has a rim 21 of a diameter and shape to form a seat for the flange of a half-tire 13 to be cut on the machine. It will be seen that the wheel 20 is capable of two turning motions: one in a vertical plane around the axle 19 and the other in a horizontal plane around the pivot axis 16.

A horizontal shaft 22 is rotatably mounted in the frame 14 on the left hand side of the machine (see Fig. 2) at right angles to the beam 14c.

The machine is driven by a motor 24 through pulley 23 mounted on the shaft 22. A second pulley 25 fixed to the shaft 22 drives over a belt 26 and pulley 27 a worm shaft 28, the worm 29 of which is in mesh with a worm wheel 30. A pitman disc 31 is mounted on the shaft 22 and imparts, by means of connecting-rod 32, an alternating rectilinear motion to a saw blade 33 guided for horizontal reciprocation towards and away from the rim 21 of wheel 20 in a vertical plane extending substantially radially of the pivot axis 16 (see Fig. 5). A stationary guide roller 34 for the cut strip is mounted rearwardly of the blade 33 with its axis parallel to the blade edge.

The means for pulling the cut strip away from the half-tire operated upon will be referred to in the following description of the operation of the machine.

The wheel 20 is swung slightly in counterclockwise direction about the pivot axis 16 from the position shown in full lines in Fig. 5, and a half tire 13 is mounted on its rim 21 and secured thereto for instance by means of bolts (see Fig. 5). Now the wheel 20 is swung back in clockwise direction, as seen in Fig. 5, about the pivot axis 16, and simultaneously it is turned in clockwise direction, as seen in Fig. 2, about its axle 19 until the cut surface 12 of the half-tire 13 rests against the cutting edge of the saw blade 33 and the upper part of the cut surface 11 abuts against a stop roller 35 adjustable at right angles to its axis to determine the width of the strip to be cut. The length of the cutting edge of the blade 33 and of its cutting stroke are so related that, in each position of the blade, its cutting edge extends over the full wall thickness of the half-tire 13 mounted on the wheel 20.

The motor 24 is now started, and the wheel 20 is first turned by hand in a clockwise direction, as seen in Fig. 2 about the axle 19 until the reciprocating blade 33 has cut a strip 36 of a certain length the rear end of which is still integral with the uncut part of the half-tire. The strip 36 is guided over the guide roller 34. The cutting blade operates in a plane containing the axis 9, so that the cut is always radial with respect to the cross section of the tire and the side edges of the spiral strip cut from the tire are parallel throughout the length of the strip, and thence between two cooperating nip rollers 37 and 38, the upper one 38 of which is mounted on and driven by the shaft of the worm wheel 30. The nip rollers 37, 38 pull the strip 36, as it is cut, away from the tire towards the rear of the machine (see Fig. 4).

It will be evident that the traction thus brought to bear on the tire strip 36 will force, in the direction of the cut to be made, the tire against the cutting edge of the blade 33 and as the cut advances along the material, the annular half-tire will be forced to revolve about the axle 19 just as a reel of tape would unroll. Simultaneously, as the cut advances along the periphery of the half-tire, the wheel 20 is swung gradually in clockwise direction about the axis 16, as seen in Fig. 5, towards the blade 33 and against the adjustable roller 35, thus feeding the tire to the blade for a continuous spiral cut. The position assumed by the wheel 20 and half-tire 13 when about one third of the half-tire has been sliced away is shown in broken lines in Fig. 5. The cutting of the continuous spiral strip from the half-tire continues automatically until all the material of the half-tire, except the flange bolted to the wheel rim 21, has been sliced away.

Due to the fact that the cutting blade operates always in a plane substantially radial to the axis 16 and, thus, to the cross-section of the half-tire, the side edges of the spiral strip cut from the half-tire are parallel throughout the length of the strip.

It should be understood that the invention may be carried out with numerous modifications in the shape and arrangement of the operating elements and that its scope is not intended to be limited to the specific embodiment shown and described, except as defined in the following claims.

Having now particularly described and ascertained the nature of my said invention and in what manner the same is to be performed, I declare that what I claim is:

1. In a machine for cutting an annulus having a cross section corresponding substantially to that of a sector of a hollow cylinder into a single spiral strip, the combination of a carrier to support said annulus for rotation about its own axis, means supporting said carrier for a swinging movement about a second axis passing at right angles to a cross-section of an annulus mounted on said carrier substantially through the imaginary center of said cross-section, and cutting means arranged to operate in a cutting plane substantially radial relative to said second axis.

2. A machine, as claimed in claim 1, in which said cutting means includes a blade and means to reciprocate said blade in said cutting plane.

3. A machine, as claimed in claim 1, including means to pull the cut strip away from said carrier in a direction to cause rotation of said annulus about its axis and also to cause a swinging movement of said carrier about said second axis towards said cutting means.

4. A machine, as claimed in claim 1, including adjustable abutment means arranged near said cutting means to limit the swinging of said carrier towards the latter and to determine the thickness of the strip cut.

ENÉAS GUIMARÃES MASCARENHAS.